3,503,145
DEFERRED CURING PROCESS FOR TEXTILE FABRICS

Fujio Mashio, Kyoto, and Sadatoma Maruta, Eiichi Kawai, and Hiroki Yamamoto, Takarazuka-shi, and Shigeru Tajima, Ashiya-shi, Japan, assignors to Sumitomo Chemical Company, Ltd., Osaka, Japan, a corporation of Japan
No Drawing. Filed Jan. 21, 1966, Ser. No. 522,041
Claims priority, application Japan, July 13, 1965, 40/42,196; Dec. 1, 1965, 40/74,116
Int. Cl. D06c *27/100;* D06m *15/52*
U.S. Cl. 38—144        2 Claims

ABSTRACT OF THE DISCLOSURE

Textile fabric is endowed with crease resistance and permanent press properties by a deferred curing process employing as an impregnating agent a N-methylolated acrylamide telomer.

---

The present invention relates to novel deferred cure process for finishing textile fabrics with novel resin composition.

One object of the present invention is to provide a novel process for endowing permanent and distinct pleats and dry and wet crease resistance and permanent hardness and repulsion with fullness, by deferred cure process to a garment fabric.

Other objects will be apparent from the following description.

In order to accomplish these objects, the present invention provides a novel process for endowing permanent and distinct pleats and dry and wet crease resistance and permanent repulsion with fullness, by deferred cure process to a garment fabric comprising said fibers, which comprises dipping cloth of said fabric into a resin bath, which consists essentially of an aqueous solution of novel N-methylolated acrylamide telomer having the formula,

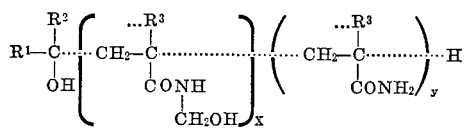

wherein $R^1$ and $R^2$ are hydrogen or alkyl having 1 to 12 carbon atoms, $R^3$ is hydrogen or methyl, $x$ and $y$ are integers and $(x+y)$ is an integer of from 2 to 30, said resin bath containing a curing agent, squeezing said cloth, pre-drying the impregnated cloth, sewing the dried cloth to make into a garment, pressing the garment and heating the pressed garment to allow impregnated resin to cure.

The methylolation proportion, that is $$\frac{x}{x+y}$$

is from 0.1 to 1.0 preferably 0.5 to 1.0 on the total nitrogen atom.

Examples of the alcohol moiety include methanol, ethanol, n-propanol, isopropanol, n-butanol, isobutanol, n-octanol, isooctanol and n-dodecanol, among which isopropanol and isobutanol are preferably used.

The telomer of the invention may be prepared by the following procedure.

Acrylamide is dissolved in one of the above mentioned alcohols having at least one hydrogen atom on the carbon atom adjacent to the alcoholic hydroxyl group, and a radical initiator, such as a peroxide, is then added to the resulting solution. The resulting mixture is heated to effect reaction to obtain an acrylamide telomer according to the following reaction equation:

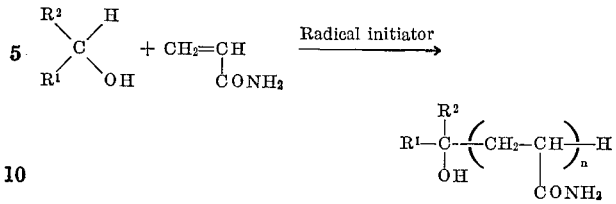

The reaction is caused according to a so-called telomerization. That is, the radical initiator is pyrolized to produce a radical and the resulting radical draws a hydrogen atom out of the alcohol to form an alcohol radical. The thus formed alcohol radical adds to the double bond of the acrylamide to form an alcohol-added acrylamide. This radical adds other acrylamide molecules, whereby the chain of the radical grows. The thus grown radical causes chain transfer to another of the excess free alcohol molecules to form an acrylamide telomer. Said acrylamide telomer is reacted with formaldehyde in aqueous solution to produce an N-methylolated acrylamide telomer. This process is described in copending application Ser. No. 519,424, filed Jan. 10, 1966.

According to the present invention N-methylolated acrylamide telomer or N-methylolated methacrylamide telomer is employed in the so called deferred cure process to endow permanent and distinct pleats to the garment fabrics. The deferred cure process is known process and disclosed in U.S. Patent 2,974,432. The advantage of the deferred cure process is that the pleats in the garment are easily made by pressing and curing and are permanent. The reason why the N-methylolated telomer of the present invention is excellent when employed in the deferred cure process is as follows. In the deferred cure process, the fabric impregnated with resin bath and dried is subjected to sewing to make into garment and then the garment is subjected to pressing and curing by heat-treatment. In commercial procedure, the impregnated fabric is stored an unavoidably considerably long period of time before subjected to sewing. During storage time if unstable resin such as N-methylolated melamine is used, the curing reaction proceeds at the temperature of storage and the excellent deferred cure product can not be obtained.

The N-methylolated telomer of the present invention is very stable even at acidic conditions. Accordingly the fabric impregnated with the bath, containing N-methylolated telomer of the present invention and curing catalyst (acidic material), is very stable under a long period of time of storage. Hence the N-methylolated telomer of the present invention is superior for the deferred cure process than other known resins.

Fabric to be employed in the present invention includes fabrics comprising fibers of natural and synthetic and mixed spun thereof. Examples of fabric of natural fiber include strings and textile fabrics of cotton, linen, silk and wool. Examples of textile fabric of synthetic fiber include strings and textile fabrics of regenerated fiber such as rayon, polyamide such as nylon, polyester such as polyethylene telephthalate, polyacrylic such as polyacrylonitrile, polypropylene and polyvinyl alcohol, among which polyester and polyamide are preferable.

Examples of mixed spun textile fabric include those of cotton and polyester, polyester and rayon, and rayon and polyamide.

It is possible to give numerous variations of effects in the processing of textile fabric, by controlling the molecular weight of the telomer, which is attained by changing the ratio of telogen to taxogen suitably in a process for producing acrylamide telomer or methacrylamide telomer.

For example, in case of natural fiber and when priority is required on crease proof properties, N-methylolated compound of the so-called average polymerization degree 5 or thereabout is suitable. Further, when emphasis is on the controlling filling of textile goods made of synthetic fiber or mixed spun fibers, a compound having relatively large molecular weight is preferred. Furthermore, much more interesting processing effects can be obtained in case a mixture of two or more different molecular weight N-methylolated acrylamide telomers or N-methylolated methacrylamide telomers is used.

As the curing catalyst to be used in the present invention, inorganic and organic salts catalysts usually used for resin treatment, such as zinc nitrate, magnesium chloride, diammonium hydrogen phosphate, ammonium chloride, mineral acid salts of 2-amino-2-methylpropanol and ethanol amines, are suitable. Sufficient effects can be exhibited in the range of heat treatment temperature and time of the processing conditions being conventionally applied to the textile fabric processing. Said telomer is very stable and the stability thereof is still great even in a resin treatment bath to which a curing catalyst is added, and also has an advantage in allowing very easy and simple processing operation similar to the case of using an initial condensation product of conventional thermosetting resin.

In carrying out the process of the present invention N-methylolated product of said telomer is dissolved in water and curing catalyst is added thereto to obtain a resin bath.

The preferable concentration of said telomer is 0.1 to 20 weight percent based on the weight of resin bath, and the preferable amount of the curing catalyst is 1 to 3 parts by weight per 10 parts by weight of the telomer.

The textile fabric to be treated is dipped into the resin bath, squeezed at a rate of 50 to 100% more preferably 60 to 80% and pre-dried at a temperature of 80° to 105° C. for 2 to 5 minutes.

Thereafter the fabric is cured after subjected to sewing and pressing. The curing is conducted by heat-treatment at a temperature between 120° and 180° C. more preferably 130° and 160° C. for 3 to 10 minutes.

As described above, fabric impregnated by said telomer is very stable even in the presence of acid catalyst and in particular there is no injurious effect without soaping.

Further, in processing, it is possible to add a pre-condensation product of other thermosetting resin, thermoplastic resin and other auxiliaries to the same resin treatment bath.

Examples of the thermosetting resin include N-methylolated glyoxal monoureine, alkyl carbamate, N-methylolated melamine, N-methylolated urea, N-methylolated ethyeneurea, N-methylolated uron, and N-methylolated triazone. Examples of the thermoplastic resin include poly-(acrylic acid ester), poly-(vinyl acetate) and poly-(acrylamide).

Preferable resin to be used in the combination use with the telomer in deferred cure process is N-methylolated glyoxal monoureine, and alkyl carbamate. In such case 80 to 0.5 parts by weight of the N-methylolated telomer of the present invention is preferably mixed with 100 parts by weight of the glyoxal or carbamate resin.

The following examples are given only by way of illustration of the present invention, and it is not intended to limit the present invention to the examples.

EXAMPLE 1

To a 10% aqueous solution of N-methylolated acrylamide telomer prepared from isopropanol and acrylamide monomer and formaldehyde and having 1% of zinc nitrate, $Zn(NO_3)_2 \cdot 6H_2O$, is added as a condensation catalyst to obtain a resin bath. In the resin bath, 40's cotton broad cloth is immersed, squeezed to 80% and pre-dried at 80° C. for 2 minutes.

The results of test on the resultant cloth of the influences for the storage stability and the cases in which soaping is not carried out after curing, are obtained by means of measuring crease resistance degree, which are tabulated in the following Table 1 together with results with soaping. The curing is conducted at 150° C. for 3 minutes and soaping is conducted in the presence of 0.2% of neutral cleanser and 0.2% of soda ash for 3 seconds at 45° C. in order to neutralize and eliminate remaining catalyst. Furthermore, storage is conducted under the accelerated conditions of high temperature and humidity such as 40° C. and relative humidity 80%.

TABLE 1

| | Average polymerization degree | Methylolation degree | $MCRA_0$ | $MCRA_1$ | $MCRA_2$ | $MCRA_3$ | FFns, p.p.m. | FFs, p.p.m. |
|---|---|---|---|---|---|---|---|---|
| N-methylolated acrylamide telomer. | 5.2 | 92 | 240 | 232 | 169 | 171 | 29.4 | 10.5 |
| | 12.9 | 98 | 251 | 249 | 170 | 168 | 25.8 | 10.9 |
| | 12.9 | 50 | 249 | 241 | 168 | 272 | 0.1 | |
| Trimethylol melamine | | | 227 | 192 | 182 | 199 | 121.0 | 68.8 |
| Ethylene urea formaldehyde resin | | | 244 | 195 | 195 | 208 | 158.0 | 77.2 |
| Glyoxal monoureine formaldehyde resin | | | 296 | 277 | 175 | 180 | 19.5 | 7.9 |
| Unprocessed cloth | | | 160 | 164 | 164 | 169 | | |

$MCRA_0$: Crease recovery angle of processed cloth subjected to soaping just after curing.

$MCRA_1$: Crease recovery angle of cloth subjected to curing after allowing to stand for one week at 40° C. and relative humidity of 80% subsequent to pre-drying (deferred-cure property).

$MCRA_2$: Crease recovery angle after pre-drying.

$MCRA_3$: Crease recovery angle after allowing to stand for one week at 40° C. and relative humidity of 80% subsequent to pre-drying.

FFns: Amount of formalin generated from processed cloth which has not been subjected to soaping after curing.

FFs: Order of formalin generated from processed cloth subjected to soaping after curing.

(FFns and FFs respectively represent values of p.p.m. based on the weight of cloth.) Furthermore, determination of formalin is conducted at 50° C. for 20 hours and, thereafter values are obtained according to chlomotolope acid method.

As is clear from the above results, according to the telomer of the present invention it is indicated that crease recovery angle after pre-drying does not differ substantially from that obtained after one week and is stable. On the contrast, according to aminoplast system, as gradual change of stability is recognized the stability thereof is indicated to be poor. Futhermore, as shown in $MCRA_1$ and $MCRA_0$ in the former case substantial difference of crease proof degree is not recognized between those subjected to deferred curing and ordinary curing, while in the latter case it is recognized that said degree of the goods subjected to deferred curing is markedly poor. Further, in accordance with the telomer of the present invention the generating amount of formalin is very small even if the processing cloth is not subjected to soaping. From the above facts, it is evident that the telomer of the present invention is to satisfy enough the conditions under which the permanent press processing can possibly be carried out according to deferred curing process.

EXAMPLE 2

To a 5% solution of N-methylolated acrylamide telomer prepared from isopropanol and acrylamide monomer and formaldehyde and having polymerization degree, 5.2, methylolation degree, 100%, 0.5% of magnesium chloride, $MgCl_2 \cdot 6H_2O$, is added to obtain a resin bath. In the resin bath, is immersed 40's cotton broad cloth, squeezed at the rate of 80%, dried at 80° C. for 2 minutes and then allowed to stand for 6 months at room temperature. Thereafter pleats of the resultant cloth is pressed for 15 seconds at 150° C. and under 0.2 kg./cm.² by use of tailor press machine and subjected to curing at 150° C. for 3 minutes.

The pleats preserving property of this cloth is compared with those of processed cloths treated with use of melamine-formalin and ethylene urea formalin having about same number of methylol radicals under the same conditions to obtain the results which will be tabulated in Table 2.

TABLE 2

|  | Initial | Aft. HL 5 turns | Aft. HL 20 turns |
|---|---|---|---|
| N-methylolated acrylamide telomer | 5 | 4.5 | 4 |
| Trimethylol melamine | 4 | 2 | 1 |
| Ethylene urea formaldehyde resin | 5 | 1 | 1 |

The pleats preserving property is evaluated by collating with the standard photographs in accordance with AATCC-88C-1964 T.

As is evident from the above results, while good pleats preserving property is imparted to the processed cloth prepared by the telomer of the present invention, melamine-treated cloth, for the sake of contrast, is difficult to form pleats and is not so good. This is to endorse the results of Example 1 that while allowed to stand after pre-drying a linking reaction proceeds gradually and results in a partially cured state. Furthermore, in the case of ethylene urea resin, pleats can be easily obtained but no durability is recognized. As is clearly shown even in Example 1, this is understood that linking ability is lost due to decomposition reaction of resin during storage and the effect of fixing cellulose to a certain shape is already lost.

EXAMPLE 3

To a 5% solution of a carbamate series resin, is added 0.5% of N-methylolated acrylamide telomer having average polymerization degree of 12.9 and 89% methylolation degree, to obtain a resin bath to which zinc nitrate is added as a condensation catalyst. To the resin bath thus obtained, polyethylene terephthalate rayon (65/35) serge is immersed, squeezed at the rate of 60%, dried at 80° C. for 3 minutes and then allowed, as it is, to stand for 6 months at room temperature. Thereafter, the pleats are pressed by use of tailor press machine for 15 seconds at 150° C. and under 0.2 kg./cm.², and then subjected to curing at 150° C. for 3 minutes.

The results of comparisons of the hardness effect and pleats preserving property of the above cloth with those of cloths treated in the treatment bath as shown in Table 3, will be tabulated in Tables 4 and 5. In column (2) of Table 5 hardness effect obtained by press curing immediately after pre-drying is tabulated for the sake of comparison, and the results of determination of amounts of formalin generated after curing will be tabulated in Table 6.

TABLE 3

|  | A | B | C |
|---|---|---|---|
| Carbamate resin | 5 | 5 | 5 |
| N-methylolated acrylamide telomer | 0.5 | | |
| Trimethylol melamine | | | 0.5 |
| Zinc nitrate | 0.7 | 0.7 | 0.7 |
| Total Vol. (ml.) | 100 | 100 | 100 |

TABLE 4.—PLEATS PRESERVING PROPERTY

|  | A | B | C |
|---|---|---|---|
| Initial | 5 | 5 | 5 |
| After 20 HL turns | 4.3 | 3.7 | 3.7 |

TABLE 5.—MODULUS OF RIGIDITY

| Total hand, g./20 mm. | A | B | C | Blank |
|---|---|---|---|---|
| (1) Being left for 6 months after pre-drying | 125 | 76 | 90 | 71 |
| (2) Being cured immediately after pre-drying | 127 | 79 | 131 | |

TABLE 6.—AMOUNT OF FORMALIN GENERATED

[P.p.m. based on the weight of cloth]

|  | A | B | C |
|---|---|---|---|
| Extraction conditions: 50° C. for 16 hours | 20 | (¹) | 241 |

¹ Not detected.

Modulus of rigidity is determined by use of Handle-O-Metor manufactured by Thwing-Albert Instrument Co. (Brounlee, R. N.: Pulp & Paper, 29, No. 11, 130, 1955).

What we claim is:

1. In a deferred curing process for endowing permanent and distinct pleats and dry and wet crease resistance and permanent hardness and repulsion with fullness, wherein cloth is dipped into an aqueous resin bath containing a catalyst, and thereafter squeezing said cloth, predrying the impregnated cloth, sewing the dried cloth to make a garment, pressing the garment, and heating the pressed garment to cure the impregnated resin; the improvement comprising employing a resin bath consisting essentially of an aqueous solution of N-methylolated acrylamide telomer having the formula,

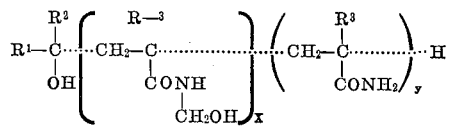

wherein $R^1$ and $R^2$ are hydrogen or alkyl having 1 to 12 carbon atoms, $R^3$ is hydrogen or methyl, $x$ and $y$ are integer and $(x+y)$ is an integer of from 2 to 30.

2. A process according to claim 1, wherein said aqueous resin bath further includes about 100 parts by weight of N-methylolated glyoxal monoureine or alkyl carbamate per 80 to 0.5 parts by weight of the N-methylolated acrylamide telomer.

References Cited

UNITED STATES PATENTS

| 2,950,553 | 8/1960 | Hurwitz | 117—139.4 X |
| 2,974,432 | 3/1961 | Warnock et al. | 117—139.4 X |
| 3,214,420 | 10/1965 | Hunt et al. | 260—89.7 |
| 3,330,687 | 7/1967 | Nawakowski | 117—161 X |

WILLIAM D. MARTIN, Primary Examiner

T. G. DAVIS, Assistant Examiner

U.S. Cl. X.R.

117—138.8, 141, 143, 145, 161